(12) United States Patent
Duong (10) Patent No.: US 10,328,799 B2
(45) Date of Patent: Jun. 25, 2019

(54) AUTOMATIC TRANSMISSION

(71) Applicant: United Technologies Corporation, Farmington, CT (US)

(72) Inventor: Hung Duong, Unionville, CT (US)

(73) Assignee: United Technologies Corporation, Farmington, CT (US)

( * ) Notice: Subject to any disclaimer, the term of this patent is extended or adjusted under 35 U.S.C. 154(b) by 70 days.

(21) Appl. No.: 15/665,664

(22) Filed: Aug. 1, 2017

(65) Prior Publication Data

US 2019/0039454 A1 Feb. 7, 2019

(51) Int. Cl.

| F16D 11/10 | (2006.01) |
|---|---|
| B60K 23/08 | (2006.01) |
| F16H 37/02 | (2006.01) |
| F16H 61/662 | (2006.01) |
| F02C 9/58 | (2006.01) |

(Continued)

(52) U.S. Cl.
CPC .......... *B60K 23/0808* (2013.01); *F02C 3/113* (2013.01); *F02C 7/36* (2013.01); *F02C 9/58* (2013.01); *F16D 11/10* (2013.01); *F16D 13/24* (2013.01); *F16D 21/04* (2013.01); *F16D 23/10* (2013.01); *F16D 23/14* (2013.01); *F16H 37/022* (2013.01); *F16H 61/66259* (2013.01); *B62M 11/16* (2013.01); *F05D 2240/40* (2013.01); *F05D 2260/4023* (2013.01); *F16D 13/26* (2013.01); *F16D 21/06* (2013.01); *F16D 2021/0646* (2013.01); *F16H 3/089* (2013.01); *F16H 2055/178* (2013.01); *F16H 2200/0039* (2013.01)

(58) Field of Classification Search
CPC .......... F16D 11/10; F16D 23/10; F16D 23/14; F16D 21/04; F16D 21/06; F16D 13/26; F16D 13/24; F02C 7/36
See application file for complete search history.

(56) References Cited

U.S. PATENT DOCUMENTS 2,178,712 A 11/1939 Whitney
2,935,882 A 5/1960 Farnsworth
(Continued)

FOREIGN PATENT DOCUMENTS

EP 2584173 B1 12/2015
GB 406470 A 3/1934

OTHER PUBLICATIONS

Extended European Search Report for EP Application No. 18186797. 9, dated Dec. 13, 2018, pp. 7.

*Primary Examiner* — Stacey A Fluhart
(74) *Attorney, Agent, or Firm* — Kinney & Lange, P.A.

(57) ABSTRACT

A clutch assembly for a transmission having a gear radially supported relative to a shaft in which the clutch assembly includes a clutch plate rotationally coupled to the shaft. The clutch plate further includes an engaged state whereby a surface of the clutch plate abuts a surface of the gear to rotationally couple the gear to the shaft and a disengaged state whereby the clutch surface is spaced from the gear surface to rotationally uncouple the gear and the clutch plate. A transmission assembly includes a first shaft, a second shaft, and a plurality of gears interconnecting the first shaft and the second shaft such that each gear of the plurality of gears is radially supported by one of the first and second shafts. The transmission assembly can further include a plurality of the clutch assemblies.

20 Claims, 6 Drawing Sheets

(51) Int. Cl.
*F02C 7/36* (2006.01)
*F16D 23/14* (2006.01)
*F16D 21/04* (2006.01)
*F16D 13/24* (2006.01)
*F16D 23/10* (2006.01)
*F02C 3/113* (2006.01)
*B62M 11/16* (2006.01)
*F16D 21/06* (2006.01)
*F16D 13/26* (2006.01)
*F16H 3/089* (2006.01)
*F16H 55/17* (2006.01)

(56) References Cited

U.S. PATENT DOCUMENTS

| | | | |
|---|---|---|---|
| 3,358,441 A | 12/1967 | Gist, Jr. | |
| 4,545,469 A * | 10/1985 | Yogome | F16H 3/14 192/109 A |
| 4,802,375 A | 2/1989 | Stodt | |
| 4,856,369 A | 8/1989 | Stockton | |
| 5,411,122 A * | 5/1995 | Uphaus | F16D 13/26 192/110 B |
| 5,931,760 A | 8/1999 | Beim et al. | |
| 8,475,335 B2 | 7/2013 | Lochocki, Jr. et al. | |
| 8,966,875 B2 | 3/2015 | Suciu et al. | |
| 8,978,351 B2 | 3/2015 | Suciu et al. | |
| 9,163,562 B2 | 10/2015 | Suciu et al. | |
| 9,200,569 B2 | 12/2015 | Suciu et al. | |
| 9,556,956 B2 | 1/2017 | Inoue et al. | |
| 9,561,763 B2 | 2/2017 | Klemen et al. | |
| 2007/0144857 A1 * | 6/2007 | Tsukada | F16D 13/683 192/48.8 |
| 2007/0151258 A1 | 7/2007 | Gaines et al. | |
| 2008/0053775 A1 * | 3/2008 | Tsukada | F16H 3/006 192/3.57 |
| 2013/0098060 A1 | 4/2013 | Suciu et al. | |

\* cited by examiner

AUTOMATIC TRANSMISSION

BACKGROUND

The present invention relates generally to automatic transmissions and, more particularly, to automatic transmissions used in gas turbine engines to convert a turbine input into an output suitable to drive auxiliary equipment such as a generator.

Two-spool gas turbine engines include, in flow series, a low pressure compressor, a high pressure compressor, a combustor, a high pressure turbine, and a low pressure turbine. The low pressure compressor is interconnected to the low pressure turbine via a first shaft and forms a low pressure spool. Similarly, the high pressure compressor is interconnected to the high pressure turbine via a second shaft that is concentric with the first shaft to form a high pressure spool. During operation, the gas turbine engine ingests air through an inlet and uses alternating rows of rotating blades and stationary vanes in the low and high pressure compressors to compress the air passing from the inlet into the combustor. Within the combustor, the compressed air mixes with injected fuel to create an air-fuel mixture, which is combusted. The combustion process produces a compressed and heated exhaust flow, which is expanded across alternating rows of rotating blades and stationary vanes to extract work from the exhaust flow. The extracted work drives the low pressure and high pressure compressors via the first and second shafts, respectively. In addition to driving the compressors of the gas turbine engine, the work extracted by the turbines can be used to drive other loads. For example, gas turbine engines can be used to drive a generator in power-producing applications. Furthermore, aircraft use gas turbine engines to drive a fan that generates thrust for propelling the aircraft. In rotor-wing aircraft, the gas turbine engines are used to drive a main rotor and auxiliary rotor in order to propel and control the rotor-wing aircraft.

In many of these applications, and particularly for gas turbine engines used on aircraft, the gas turbine engine drives an auxiliary generator. Electric power produced by the auxiliary generator is used to power various electrical systems on the aircraft. Typically, the auxiliary generators are coupled to a continuously variable transmission to form an integrated drive generator or IDG, which convert the variable speed output from the gas turbine engine to a relatively constant input for driving the generator. In other arrangements, planetary gear systems may be used to couple the auxiliary generator to a shaft of the gas turbine engine. However, each of these arrangements often require additional gear boxes and/or speed reducer arrangements to work in concert with the continuously variable transmission or planetary gear arrangements to achieve the desired speed homogenization of the gas turbine engine shaft. Furthermore, the low pressure spool of a gas turbine engine often experiences greater speed ranges and momentary speed exertions as compared to the high pressure spool.

Therefore, a need exists to provide a less complex, more reliable transmission configured to convert a highly variable input speed range to a relatively narrow output speed range.

SUMMARY

A clutch assembly for a transmission having a gear radially supported relative to a shaft in which the clutch assembly includes a clutch plate rotationally coupled to the shaft. The clutch plate further includes an engaged state whereby a surface of the clutch plate abuts a surface of the gear to rotationally couple the gear to the shaft and a disengaged state whereby the clutch surface is spaced from the gear surface to rotationally uncouple the gear and the clutch plate.

A transmission assembly includes a first shaft driven by an engine, a second shaft, and a plurality of gears interconnecting the first shaft and the second shaft such that each gear of the plurality of gears is radially supported by one of the first and second shafts. The transmission assembly can further include a plurality of clutch assemblies. Each clutch assembly has an engaged state whereby a surface of the clutch plate abuts a surface of one of the first plurality of gears to rotationally couple the gear to one of the first and second shafts and a disengaged state whereby the clutch surface is spaced from the gear surface to rotationally uncouple the gear and the clutch plate.

DETAILED DESCRIPTION

Figure 1:
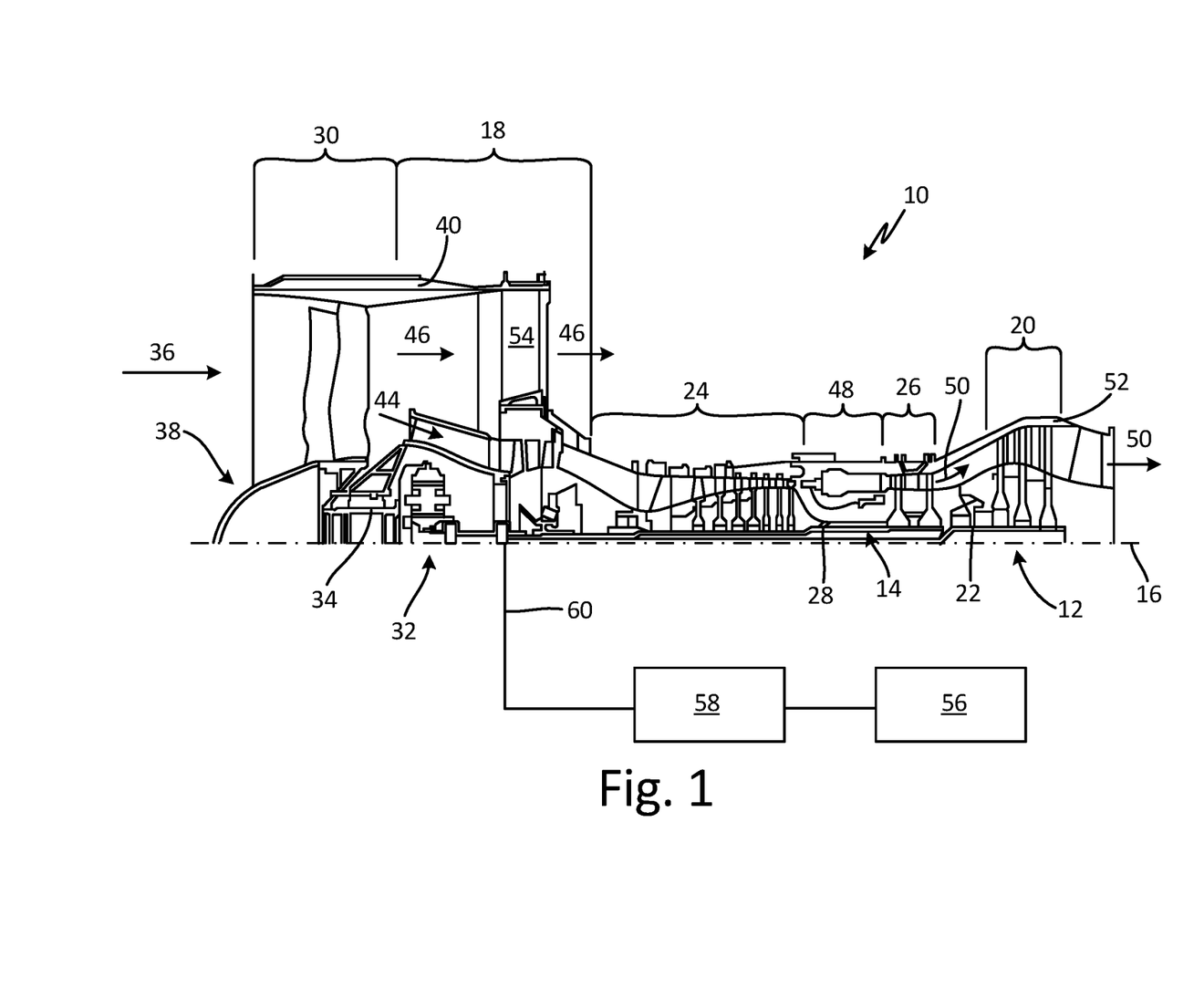
FIG. 1 is a schematic representation of a gas turbine engine having an auxiliary generator rotationally coupled to a shaft of the gas turbine engine.

FIG. 1 is a schematic representation of gas turbine engine 10 within which one or more aspects of the present invention can be implemented. Gas turbine engine 10 has a two-spool architecture that includes low pressure spool 12 and high pressure spool 14 disposed concentrically with respect to each other about axis 16. Low pressure spool 12 includes low pressure compressor 18 joined to and driven by low pressure turbine 20 via shaft 22. High pressure spool 14 includes high pressure compressor 24 joined to and driven by high pressure turbine 26 via shaft 28. Each of the low pressure compressor 18, low pressure turbine 20, high pressure compressor 24, and high pressure turbine 26 include one or more rows of rotating blades and stationary vanes, often arranged in alternating rows of rotating blades and stationary blades. Low pressure spool 12 drives fan 30, which can be directly connected to shaft 22 or, as is shown in FIG. 1, connected to shaft 22 via gearbox 32 and fan shaft 34. In the latter case, gearbox 32 includes one or more gear sets (not shown) that provide a reducing gear ratio and thereby permit fan 30 and its corresponding shaft 34 to rotate at a lesser speed relative to low pressure spool shaft 22. Although any suitable type of gearbox 32 is permitted, typically, gearbox 32 is an epicyclic gear arrangement whereby low pressure spool shaft 22 drives a sun gear and the fan shaft is driven by a ring gear, each of the sun and ring gears being enmeshed with multiple planet gears supported by a carrier restrained from rotation relative to a stationary casing of gas turbine engine 10.

In operation, rotation of fan 30 draws air flow 36 through inlet 38 formed by fan casing 40. Downstream from fan 30, air flow 36 divides into core flow 44 and bypass flow 46. Rotation of blades within low pressure compressor 18 and high pressure compressor 24 compresses core flow 44 prior to combustor 48. The compressed core flow 44 mixes with fuel injected into combustor 48 to form an air-fuel mixture that is combusted. As a consequence, compressed core flow 44 is heated to form exhaust flow 50. Blades within high pressure turbine 26 and low pressure turbine 20 extract work from exhaust flow 50 before exhaust flow 50 discharges through exhaust nozzle 52. Work extracted by high pressure turbine 26 drives high pressure compressor 24 via shaft 28, and work extracted by low pressure turbine 20 drives low pressure compressor 18 as well as fan 30. Bypass flow 46 passes through exit guide vanes 54 to straighten the air flow prior to discharging from engine 10. The total thrust produced by gas turbine engine 10 is derived from the combined effect of discharging exhaust flow 50 and bypass flow 46 from engine 10, although a substantial portion of the engine thrust is derived from discharging bypass flow 46. Due to the bypass flow configuration, gas turbine engine 10 is often called a bypass gas turbine engine and is suitable for fixed wing aircraft.

Although depicted as a bypass gas turbine engine with a two-spool architecture in the disclosed non-limiting embodiment, it should be understood that the concepts described herein are not limited to use with two-spool gas turbine engines or bypass gas turbine engine as the teachings may be applied to other types of turbine engines, some of which include gas turbine engines with three-spool architectures, turbo-shaft engines used to drive rotor-wing aircraft, turbo-shaft engines to drive industrial gas turbines, and turbo-shaft engines used to drive other vehicle types.

Gas turbine engine 10 further includes auxiliary generator 56 rotationally coupled to shaft 22 of low pressure spool 22 via transmission 58, which includes gearing configured to maintain the rotational speed of auxiliary generator 56 within a predefined operating range for at least a portion of the operating cycle of gas turbine engine 10. Transmission 58 can be directly coupled to shaft 22 or, as shown in FIG. 1, can be coupled to shaft 22 via tower shaft 60 and associated gearing such as for example, bevel gearing. With this arrangement, gas turbine engine 10 is less susceptible to load variations on auxiliary generator 56, which tend to reduce the rotational speed of low pressure spool 12, because low pressure spool 12 has, in most engines, higher rotational inertia relative to high pressure spool 14. However, it should be understood that transmission 58 could be coupled to high pressure spool 14 or possibly a third spool such has a power turbine in an engine with a three-spool architecture. In such embodiments, transmission 58 can be directly coupled to the particular shaft spool or via a tower shaft arrangement as is described here with reference to FIG. 1.

Figure 2:
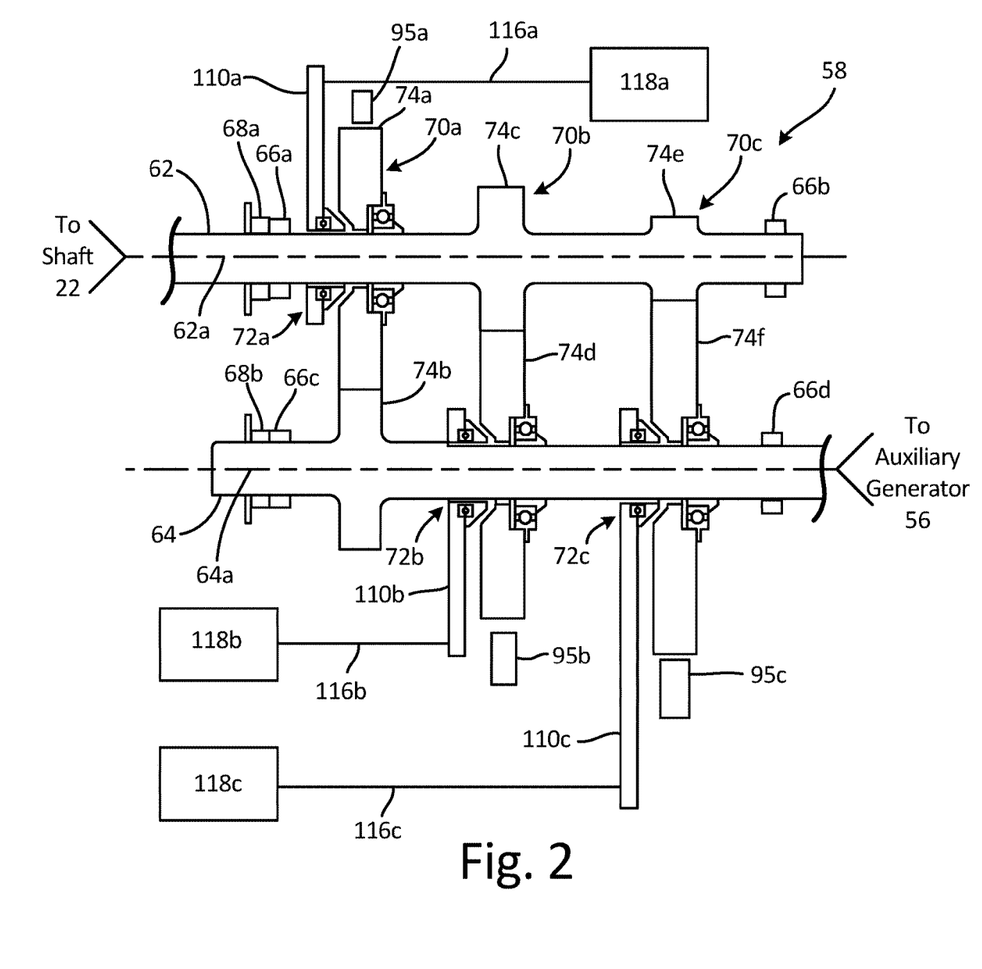
FIG. 2 is a cross-sectional view of a transmission used to couple the auxiliary generator to the gas turbine shaft.

FIG. 2 is a cross-sectional view of transmission 58 having first shaft 62 rotationally coupled to low pressure spool shaft 22 via one of the methods described above and shown schematically here. Second shaft 64 of transmission 58 is spaced from first shaft 62, each of first shaft 62 and second shaft 64 extending along axes 62a and 64a, respectively. Shafts 62 and 64 are laterally supported by at least two of bearings 66a, 66b, 66c, and 66d and axially supported by at least one of thrust bearings 68a and 68b. Although shown separately, it should be understood that lateral and axial support of shafts 62 and 64 can be accomplished at a single location using various bearing arrangements such as for example, an angular contact bearing.

Shafts 62 and 64 are rotationally coupled by mutual engagement of one or more sets of gears. Each gear set has a gear ratio defining a linear relationship between a speed of the second shaft 64 with respect to an input speed of shaft 62. The gear ratio of a particular gear set is commonly understood as the ratio of the rotational speed of the driven or output gear divided by the rotational speed of the driving or input gear. Thus, gear ratios greater than 1:1 (e.g., a 3:1 gear ratio) are speed-increasing and result in the driven gear rotating faster than the driving gear, and gear ratios less than 1:1 (i.e., a 1:3 gear ratio) are speed-reducing and result in the driven gear rotating slower than the driving gear. A gear ratio of 1:1 rotates the driven gear at the same speed as the driving gear.

Speed changing gear ratios also have an associated change in torque transmitted through the driven or output gear. A speed-increasing gear ratio produces a proportional reduction in torque transmitted by the driven gear relative to the driving gear, and a speed-decreasing gear ratio produces a proportional increase in torque transmitted by the driven gear relative to the driving gear.

Typically, and by way of example only, low pressure spool shaft speeds can range between 1,200 RPM to 10,000 RPM after initial start-up and during normal operation of gas turbine engine 10, which may include various operating points of the engine such as take-off thrust, cruise thrust, and engine idle, among others. By contrast, and to further the above example, typical auxiliary generator rotation speeds and, thus, the speed of shaft 64 can range between 4,875 RPM and 9,120 RPM to provide sufficient electric power output during the operation of gas turbine engine 10. However, it should be understood that gas turbine engines may have different shaft speed ranges depending on the particular gas turbine architecture, power rating, and application, and auxiliary generator 56 may have a different operational speed range depending on the power rating and electrical design. Where the operational range of the gas turbine shaft is greater than the operational range of the associated driven equipment, transmission 58 can be implemented to provide the desired speed and torque conversion. Furthermore, although the described embodiment of transmission 58 drives auxiliary generator 56 within a particular operational range, it should be understood that aspects of transmission 58 can be configured to operate within different speed ranges associated with other types of equipment, such as for example, a pump or other such equipment that is driven by the operation of gas turbine engine 10 that requires a narrower speed range than can be provided by low pressure spool 12 or high pressure spool 14.

To meet the operational requirements of auxiliary generator 56, transmission 58 can include one or more gear sets, each gear set having a particular gear ratio tailored to convert the rotational speed of shaft 62 to an output speed of shaft 64 proportional to shaft 62 and within a desired output speed range of the driven equipment. The selection of gear ratios is determined in part by a target gear life. In general, higher peripheral gear speeds result in lower gear life. Therefore, the maximum speed associated with each gear ratio can be limited to a maximum peripheral speed of the gears within the gear set. For example, limiting the peripheral gear speed to less than 10,000 feet per minute (fpm) generally provides adequate bearing life, although it should be understood that a different maximum peripheral speed could be achieved with different gear materials and/or loading configuration within transmission 58. Each gear ratio is also influenced by the requirement that sequential gear sets have overlapping speed ranges to facilitate shifting between gear ratios. For example, sequential gear sets 70*a-c* can have operation ranges that overlap by at least 10% to establish a zone within which shifting between gears can be accomplished without excessive loading to the gears.

Individual gear ratios are selected by engaging the clutches associated with a particular gear set. The clutch can be configured to engage the driving gear or the driven gear of the gear set. In the embodiment depicted by FIG. 2, clutches 72*a-c* are associated with the gear with a larger pitch diameter within gear sets 70*a-c*, whether the larger gear is the driven gear or the driving gear. Accordingly, the geometry of clutches 72*a-c* can be standardized such that all clutches 72*a-c* within transmission 58 are interchangeable.

FIG. 2 depicts transmission 58 with three gear sets 70*a*, 70*b*, and 70*c*. Gear set 70*a* includes gear 74*a* selectively driven by shaft 62 through engagement of clutch 72*a*. Gear 74*a* is enmeshed with the teeth of gear 74*b*, which is rotationally fixed to shaft 64. Gear set 70*b* includes gear 74*c* enmeshed with the teeth of gear 74*d*, and gear set 70*c* includes gear 74*e* enmeshed with the teeth of gear 74*f*. Gears 74*c* and 74*e* are rotationally fixed to and driven by shaft 62. Gears 74*d* and gears 74*f* are selectively rotationally coupled to shaft 64 via engagement of clutches 72*b* and 72*c*, respectively.

Gear set 70*a* has a speed-increasing gear ratio (i.e., a gear ratio greater than 1:1), and gear sets 70*b* and 70*c* each have a speed-reducing gear ratio (i.e., a gear ratio less than 1:1). With this arrangement, shaft 64 can be rotated at a faster speed than shaft 62 during relatively low speed operation of low pressure spool 12. After low pressure spool 12 obtains a sufficient speed, gear sets 70*b* and 70*c* can be used to drive shaft 64 at a slower speed relative to shaft 62 to maintain the rotational speed of shaft 62 within a desired operational range of auxiliary generator 56.

Figure 3:
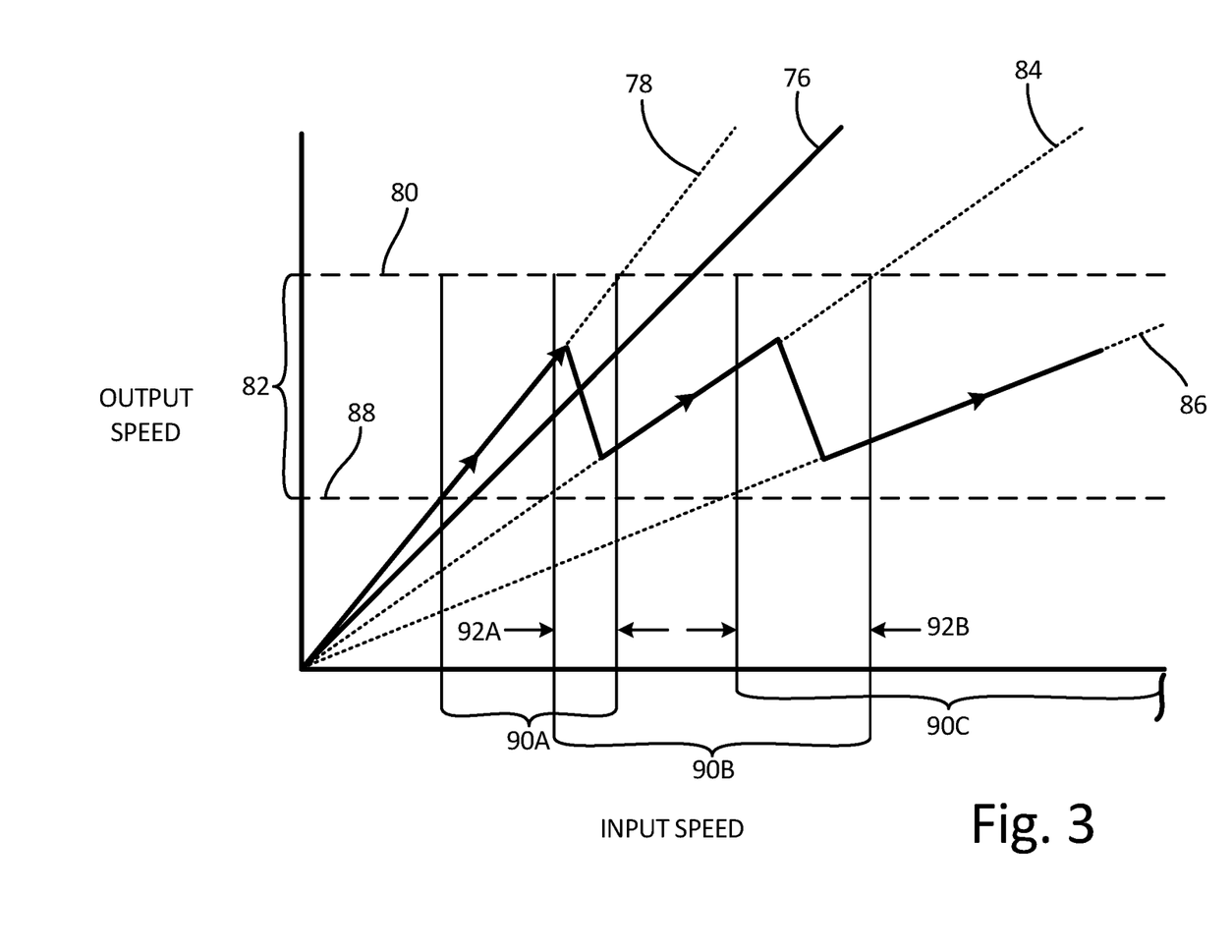
FIG. 3 is a chart showing the relationship among rotational speeds of an input shaft, an output shaft, and various gears of the transmission depicted by FIG. 2 during acceleration of the input shaft.

FIG. 3 is a chart showing the relationship among rotational speeds of shaft 62, shaft 64, and driven gears 74*b*, 74*d*, and 74*f* during acceleration of shaft 62 in which the input speed of shaft 62 is graphed along the abscissa and the output speed of shaft 64 is graphed along the ordinate. Curve 76 represents the rotational speed of shaft 62. During acceleration of shaft 62, clutch 72*a* initially engages gear 74*a* such that gear 74*a* rotates at the same speed as shaft 62. While clutch 72*a* is engaged, gear 74*a* drives gear 74*b* and shaft 64 at a speed represented by curve 78, which is greater than and proportional to a rotational speed of shaft 62. When the rotational speed of shaft 64 approaches upper limit 80 of desired output range 82, clutch 72*a* disengages, and shaft 64 begins to deaccelerate as shaft 62 continues to accelerate along with low pressure spool 12. Meanwhile, gear 74*c* rotates at the same speed as shaft 62 and drives gear 74*d* at a speed less than and proportional to shaft 62 represented by curve 84. When the speed of shaft 64 approaches the speed of gear 74*d*, clutch 72*b* engages gear 74*d* and drives shaft 64 in accordance with the speed-reducing gear ratio of gear set 70*b*. As the rotational speed of shaft 64 approaches upper limit 80 for a second time, clutch 72*b* disengages, and shaft 64 begins to deaccelerate while shaft 62 continues to accelerate along with low pressure spool 12. Similar to the prior shift operation, gear 74*e* rotates at the same speed as shaft 62 during this time and drives gear 74*f* at a speed that is less than and proportional to shaft 62, which is represented by curve 86. When the speed of shaft 64 approaches the speed of gear 74*f*, clutch 72*c* engages to drive shaft 64 with gear set 70*c*. Thus, using transmission 58 equipped with gear sets 70*a*, 70*b*, and 70*c* selectively actuated by clutches 72*a*, 72*b*, and 72*c*, respectively, the rotational speed of shaft 64 can be maintained within operational range 82 delimited by upper limit 80 and lower limit 88 given a larger operational range of shaft 62 or, in other words, low pressure spool 12. It should be noted that each of gear sets 70*a*, 70*b*, and 70*c* have respective operational ranges 90*a*, 90*b*, and 90*c* that permit shaft 64 to be driven within operation range 82. To facilitate shifting between gear set 70*a* and 70*b*, operational ranges 90*a* and 90*b* overlap, the overlap defining transition zone 92*a*. Similarly, the overlap between ranges 90*b* and 90*c* of gear sets 70*b* and 70*c* define transition zone 92*b*.

Figure 4:
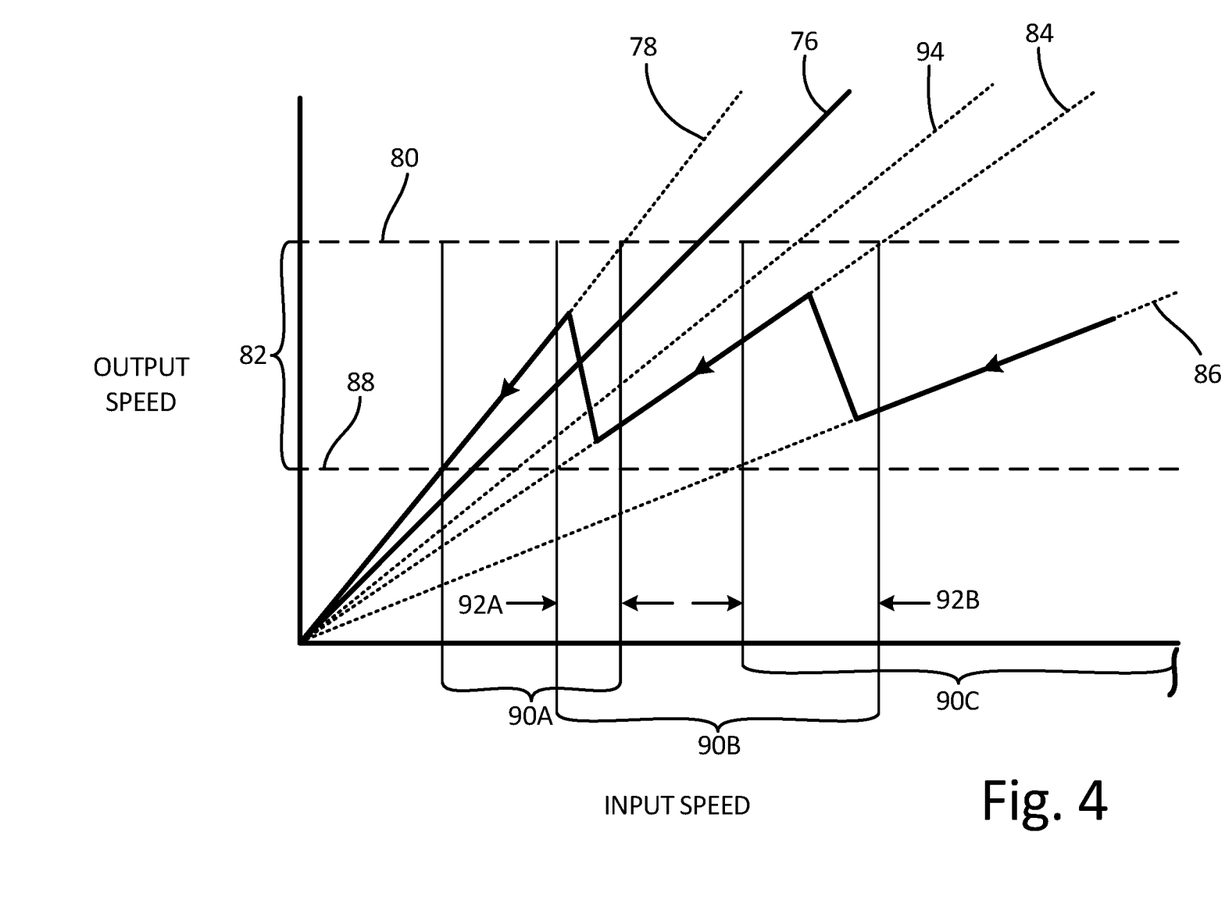
FIG. 4 is a chart showing the relationship among rotational speeds of an input shaft, an output shaft, and various gears of the transmission depicted by FIG. 2 during deceleration of the input shaft.

FIG. 4 is a chart showing the relationship among rotational speeds of shaft 62, shaft 64, and gears 74*a*, 74*d*, and 74*f* during deceleration of shaft 62 in which the input speed of shaft 62 is graphed along the abscissa and the output speed of shaft 64 is graphed along the ordinate. When the speed of shaft 62 decreases while driving shaft 64 via gear set 70*c* and at a speed represented by curve 86, shaft 62 simultaneously drives gear 74*d* via gear 74*c* at a speed represented by curve 84. As the speed of shaft 64 approaches lower limit 88 of operational range 82, the speed of shaft 64 approaches the speed of gear 74*d*. When the speed of gear 74*d* is within an acceptable range of shaft 64, clutch 74*c* disengages and clutch 74*b* engages gear 74*d* to drive shaft 64 through gear set 70*b* and at a speed represented by curve 84. Thereafter, the shifting process repeats as the speed of shaft 64 approaches lower limit 88 for a second time. Meanwhile, because clutch 72*a* is coupled to shaft 62 instead of shaft 64, shaft 64 drives gear 74*a* at a speed that is less than and proportional to shaft 64 that is represented by curve 94 when clutch 72*a* is disengaged. Because gear 72*b* is now the driving gear and gear 74*a* is the driven gear, curve 94 represents the reciprocal gear ratio of the gear ratio represented by curve 78. When the speed of gear 74*a* approaches the speed of shaft 62, clutch 72*b* disengages and clutch 72*a* engages to drive shaft 64 through gear set 70*a* at a speed represented by curve 78.

Shifting between sequential gear sets 70*a*, 70*b*, and 70*c*, whether shaft 62 is accelerating and deaccelerating, is accomplished when the speed of the yet-to-be-engaged clutch is within a desired range of the yet-to-be-engaged shaft. In some embodiments, gear ratios are selected such that shifting can occur when the speeds of respective parts differ by no more than 10%, and more preferably, within 5%. Generally, as the difference in speed increases, the load imposed on the clutch and associated gears increases. It is therefore desirable to minimize the speed difference in order to prolong the life of transmission 58. The speeds of respective gears are monitored using sensors 95*a*, 95*b*, and 95*c* (see FIGS. 2 and 5) which are arranged in proximity to one of the gears within gear sets 70*a*, 70*b*, and 70*c*. In this case, sensors 95*a*, 95*b*, and 95*c* are located at the peripheries of gears 74*a*, 74*d*, and 74*f*, respectively. The speeds of gears 74*b*, 74*c*, and 74*e* are derived from the speed measurement of gears 74*a*, 74*d*, and 74*f*, respectively knowing the gear ratios of each of gear sets 70*a*, 70*b*, and 70*c*. Rotational speeds of shafts 62 and 64 can be measured independently or derived from the speed measurements of gear 74*a*, 74*d*, and 74*f*, the gear ratios of 70*a*, 70*b*, and 70*c*, and the engaged states of one of clutches 72*a*, 72*b*, and 72*c*. Sensors 95*a*, 95*b*, and 95*c* can be any suitable probe providing a signal from which rotational speed can be calculated such as, for example, a proximity probe. Signals from sensors 95*a*, 95*b*, and 95*c* can be processed by a controller (not shown) which, in turn, controls actuators 118a, 118b, and 118c to engage or disengage clutches 72a, 72b, and 72c at the appropriate times.

Although this embodiment discloses three gear sets 70a, 70b, and 70c, it should be appreciated that additional gear sets 70 can be added to permit a larger input speed range of shaft 62 or removed to cover a smaller input speed range of shaft 62. Additional gear sets 70 can also be added to reduce the difference between upper limit 80 and lower limit 88 or can be removed to increase the difference between upper and lower limits 80 and 88 as required by the specific embodiment. Therefore, because shafts 62 and 64 are parallel, transmission 58 can be expanded or reduced to provide a greater degree of customization of operation range 82 than is easily achieved by other transmission arrangements.

Figure 5:
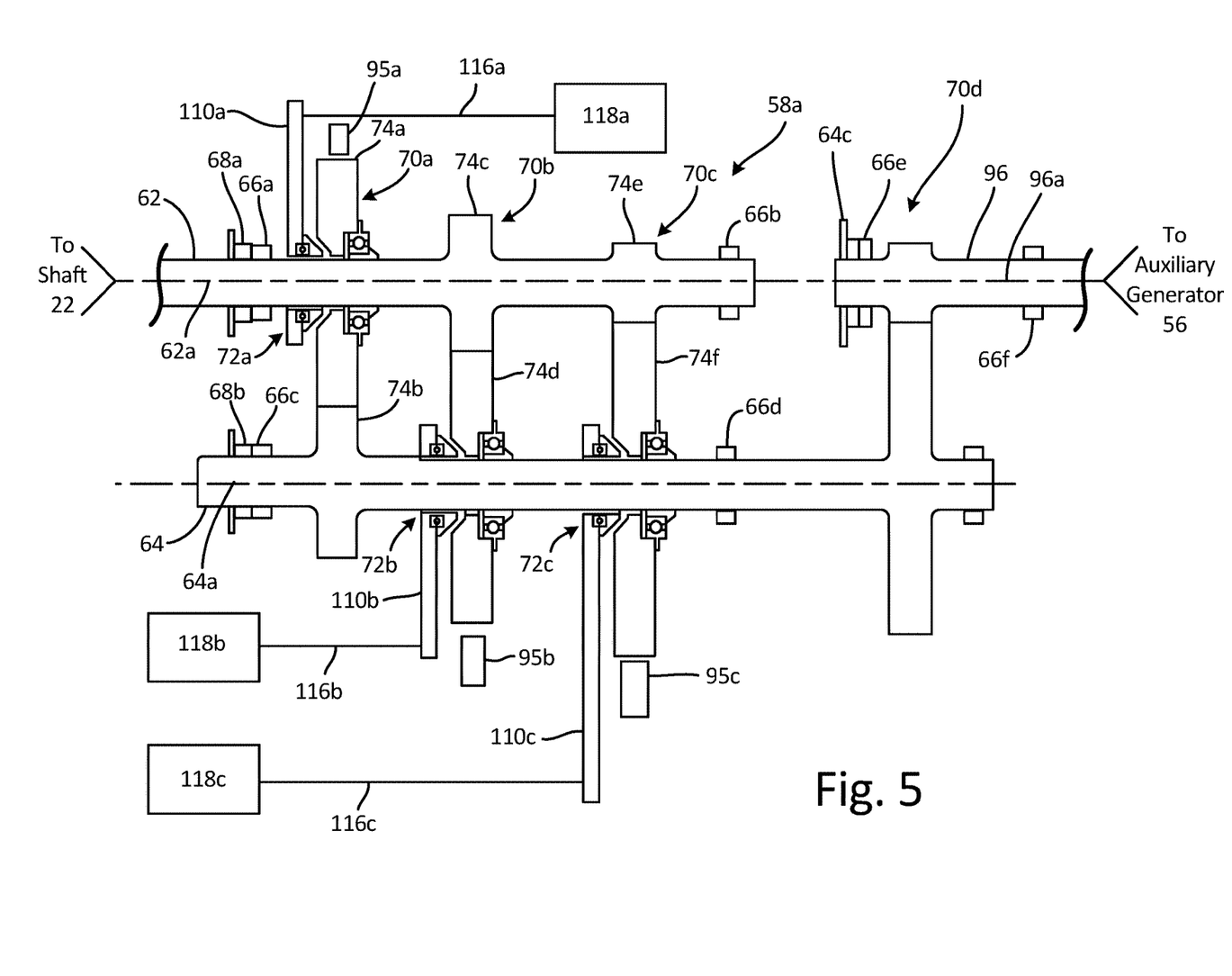
FIG. 5 is cross-sectional view of another transmission used to couple the auxiliary generator to the gas turbine shaft that includes a third shaft driven by a speed-increasing gear set.

FIG. 5 is a cross-sectional view of transmission 58a that includes many of the elements of transmission 58 described above and represented by like reference numerals. However, transmission 58a additionally includes third shaft 96 which rotates about axis 96a. Bearings 66e and 66f laterally support shaft 96 whereas at least one thrust bearing 64c axially supports shaft 96. Like shafts 62 and 64, lateral and axial support of shaft 96 need not be provided with separate bearings as shown in FIG. 5, but instead could be laterally and axially supported at a particular location with a single bearing such as an angular contact bearing. Furthermore, axis 96a of shaft 96 can extend parallel to one or both shaft axes 62a and 64a, or can extend obliquely with respect to shaft axes 62a and 64a with appropriate gearing. Shaft 96 is rotationally coupled to shaft 64 via gear set 70d, which can have a speed-reducing or a speed-increasing gear ratio as needed. In this particular embodiment, gear set 70d has a speed-increasing gear ratio to offset the desired output range. With this configuration, shaft 96 drives auxiliary generator 56 instead of shaft 64. In all other respects, transmission 58a operates in a manner similar to transmission 58.

Figure 6:
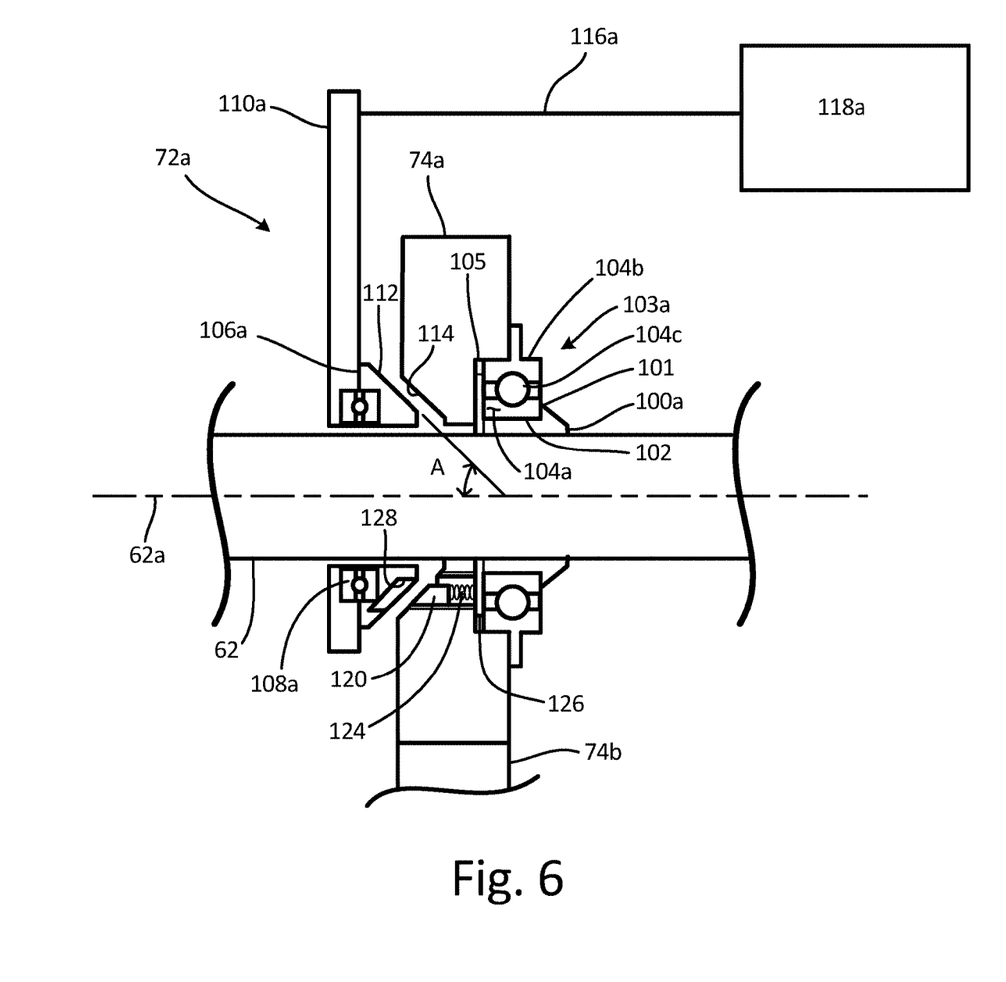
FIG. 6 depicts a clutch assembly representative of any of the clutches used within the transmissions depicted by FIGS. 2 and 5.

FIG. 6 is a cross-sectional view of clutch 72a. However, it should be understood that clutch 72a is representative of any of the other clutches used in transmissions 58 and 58a, which have like reference numerals depicted in FIGS. 2 and 5.

With this arrangement, bearing runner 100a is fixed to shaft 62 such that runner 100a rotates at the same speed as shaft 62. For example, bearing runner 100a can have a shaft key (not shown) extending between and aligned with axially-extending grooves in bearing runner 100a and shaft 62. Instead of using a shaft key, bearing runner 100a could have an interference fit to shaft 62 among other known methods to restrain bearing runner 100a with respect to shaft 62. Bearing runner 100a can include lip 101 that extends radially outward with respect to axis 62a and circumferentially around shaft 62 to form an axial stop and restraint for bearing 103a. Bearing 103a is concentrically disposed about runner 100a and engages circumferential surface 102 for lateral support. As shown, bearing 103a is a ball bearing that includes inner race 104a engaging bearing runner 100a and outer race 104b engaging bore 105 recessed from an axially-facing surface of gear 74a. Disposed between inner race 104a and outer race 104b are balls 104c whereby rolling contact between mating surfaces of inner race 104a, outer race 104b, and balls 104c permit gear 74a to rotate independently of shaft 62 when clutch 72a is disengaged.

Clutch 72a includes clutch plate 106a, thrust bearing 108a, and actuator arm 110a. Clutch plate 106a is rotationally restrained relative to shaft 62 but is permitted to slide axially with respect to shaft 62 in a direction parallel to axis 62a. Although many methods of guiding clutch plate 106a could be implemented, one method includes a guiding key (not shown) having a sliding fit with respect to a groove within clutch plate 106a and a location fit with respect to a groove in shaft 62. Clutch plate 106a includes friction surface 112 that has a shape that is complementary to a shape of mating friction surface 114 of gear 74a. In some embodiments, corresponding surfaces 112 and 114 of clutch plate 106a and gear 74a have conical shapes that form angle A with respect to axis 62a in a cross-sectional plane that includes axis 62a. In this instance, clutch plate 106a forms the male part in which the conical surface is formed by a radially outer surface of clutch plate 106a with respect to axis 62a, and surface 114 of gear 74a forms the corresponding female part. Angle A can be greater than 0 degrees up to 90 degrees, and it will be appreciated that the force normal to surface 112 can be tailored by altering angle A and the axial force imposed by an actuator.

Thrust bearing 108a is joined to clutch plate 106a for support such that thrust bearing 108a moves axially with clutch plate 106a. Actuator arm 110a is joined to thrust bearing 108a such that thrust bearing 108a is disposed axially between clutch plate 106a and actuator arm 110a. Actuator arm 110a extends radially outward with respect to axis 62a of shaft 62 a sufficient distance to clear gear 74a and the gears of any other gear sets within transmission 58. At a distal end of actuator arm 110a relative to shaft 62, linkage 116a is affixed to actuator arm 110a and extends parallel to axis 62a to linear actuator 118a, which is affixed to and restrained by a stationary structure of gas turbine engine 10. Accordingly, actuator arm 110a is rotationally restrained about axis 62a by linkage 116a and linear actuator 118a, and clutch plate 106a is permitted to rotate at the same speed as shaft 62 via thrust bearing 108a.

In an engaged state, linear actuator 118a retracts linkage 116a in a direction parallel to axis 62a. As linkage 116a retracts, clutch plate 106a, thrust bearing 108a, and actuator arm 110a move axially towards gear 74a until friction surface 112 engages complementary surface 114 of gear 74a. Clutch plate 106a transmits the axial force imposed by actuator 118a onto gear 74a through surface 114. The component of the axial force normal to surfaces 112 and 114 imposes a frictional force between clutch plate 106a and gear 74a to rotationally couple clutch plate 106a and gear 74a.

In some embodiments, clutch 72a additionally includes locking member 120 disposed within recess 122 of gear 74a. Biasing member 124 is disposed between locking member 120 and retaining ring 126 affixed within a groove of gear 74a and causes locking member 120 to protrude through surface 114 of gear 74a. In this embodiment, clutch plate 106a includes bore 128 extending into clutch plate 106a from surface 112. Bore 128 has a shape complementary to a shape of locking member 120, and bore 128 and locking member 120 are disposed at the same radial distance from axis 62a. Therefore, bore 128 is adapted to receive locking member 120 when clutch 72a is in an engaged state and to rotationally couple clutch 72a to gear 74a. Should bore 128 and locking member 120 be circumferentially misaligned when clutch plate 106a engages gear 74a, the friction between surfaces 112 and 114 rotationally couples clutch plate 106a and gear 74a. If slippage occurs after engagement, bore 128 and locking member 120 will become aligned due to the slippage. Thereafter, biasing member 124 engages locking member 120 with bore 128 to rotationally couple clutch plate 106a and gear 74a. Accordingly, locking member 120 can provide a primary means or secondary means of rotationally coupling clutch plate 106a and gear 74a.

In a disengaged state, actuator 118a extends linkage 116a in a direction parallel to axis 62a and opposite the retraction direction. As linkage 116a extends, clutch plate 106a, thrust bearing 108a, and actuator arm 110a move axially away from gear 74a until friction surface 112 is spaced from complementary surface 114 of gear 74a. As such, gear 74a is rotationally uncoupled to shaft 62a when clutch 72a is in the disengaged state.

The configuration of clutch 72a can be applied to clutches 72b and 72c, each clutch having components that are interchangeable with the other clutches. Accordingly, linear actuator 118b translates clutch 72b between engaged and disengaged states via linkage 116b, actuator arm 110b, and linear actuator 118c translates clutch 72c between engaged and disengaged states via linkage 116c, actuator arm 110c in the same manner as linear actuator 118a.

Discussion of Possible Embodiments

The following are non-exclusive descriptions of possible embodiments of the present invention.

A clutch assembly for a transmission having a gear radially supported relative to a shaft according to an exemplary embodiment of this disclosure, among other possible things includes a clutch plate rotationally coupled to the shaft. The clutch plate has an engaged state whereby a surface of the clutch plate abuts a surface of the gear to rotationally couple the gear to the first shaft and a disengaged state whereby the clutch surface is spaced from the gear surface to rotationally uncouple the gear and the clutch plate.

The clutch assembly of the preceding paragraph can optionally include, additionally and/or alternatively, any one or more of the following features, configurations and/or additional components:

A further embodiment of the foregoing clutch assembly, wherein the clutch assembly can further include a bearing runner rotationally coupled and affixed to the shaft.

A further embodiment of any of the foregoing clutch assemblies, wherein the clutch assembly can further include a bearing laterally restraining the gear relative to the shaft.

A further embodiment of any of the foregoing clutch assemblies, wherein the clutch assembly can further include joining the bearing to the bearing runner and the gear such that the bearing radially restrains the gear relative to the shaft and permits rotation of the gear about the shaft.

A further embodiment of any of the foregoing clutch assemblies, wherein the clutch assembly can further include a thrust bearing joined to the clutch plate.

A further embodiment of any of the foregoing clutch assemblies, wherein the clutch assembly can further include an actuation arm supported by the thrust bearing relative to the first shaft such that the thrust bearing permits relative rotation between the actuation arm and the clutch plate.

A further embodiment of any of the foregoing clutch assemblies, wherein the clutch assembly can further include a locking member disposed within a recess of the gear.

A further embodiment of any of the foregoing clutch assemblies, wherein the clutch assembly can further include a biasing member abutting the locking member causing a portion of the locking member to protrude from the gear towards the clutch plate.

A further embodiment of any of the foregoing clutch assemblies, wherein the clutch plate has a bore aligned with the locking member such that the locking member engages the bore in the engaged state of the clutch plate and thereby rotationally couples the gear and the clutch plate.

A further embodiment of any of the foregoing clutch assemblies, wherein the clutch surface and the gear surface have complementary conical shapes.

A transmission according to an exemplary embodiment of this disclosure, among other possible things includes a first shaft driven by an engine, a second shaft, a plurality of gears interconnecting the first shaft and the second shaft, a plurality of clutch assemblies, each clutch assembly comprising a clutch plate rotationally coupled to one of the first and second shafts. Each clutch plate has an engaged state whereby a surface of the clutch plate abuts a surface of one of the first plurality of gears to rotationally couple the gear to one of the first and second shafts and a disengaged state whereby the clutch surface is spaced from the gear surface to rotationally uncouple the gear and the clutch plate.

The transmission of the preceding paragraph can optionally include, additionally and/or alternatively, any one or more of the following features, configurations and/or additional components:

A further embodiment of the foregoing transmission, wherein the transmission can further include a first clutch assembly having a first clutch plate rotationally coupled to the first shaft and configured to engage a first gear.

A further embodiment of any of the foregoing transmissions, wherein the first clutch assembly can have an engaged state that couples the first shaft to the second shaft via a first set of the plurality of gears.

A further embodiment of any of the foregoing transmissions, wherein the first set of gears can have a speed-increasing gear ratio.

A further embodiment of any of the foregoing transmissions, wherein the assembly can further include a second clutch assembly having a second clutch plate rotationally coupled to the second shaft and configured to engage a second gear.

A further embodiment of any of the foregoing transmissions, wherein the second clutch assembly can have an engaged state that couples the first shaft to the second shaft via a second set of the plurality of gears.

A further embodiment of any of the foregoing transmissions, wherein the second set of gears can have a speed-reducing gear ratio.

A further embodiment of any of the foregoing transmissions, wherein the transmission can further include a third clutch assembly having a third clutch plate rotationally coupled to the second shaft and configured to engage a third gear.

A further embodiment of any of the foregoing transmissions, wherein the third clutch assembly can have an engaged state that couples the first shaft to the second shaft via a third set of the plurality of gears.

A further embodiment of any of the foregoing transmissions, wherein the third set of gears can have a speed-reducing gear ratio.

A further embodiment of any of the foregoing transmissions, wherein the first shaft can have an operational range from a first rotational speed to a second rotational speed, A further embodiment of any of the foregoing transmissions, wherein the first, second, and third gear ratios can be configured to maintain the second shaft between a third rotational speed and a fourth rotational speed.

A further embodiment of any of the foregoing transmissions, wherein the difference between the first and second rotational speeds can be greater than the difference between the third and fourth rotational speeds.

A further embodiment of any of the foregoing transmissions, wherein the transmission can further include a third shaft.

A further embodiment of any of the foregoing transmissions, wherein the transmission can further include a second plurality of gears interconnecting the second shaft to the third shaft.

A further embodiment of any of the foregoing transmissions, wherein the second plurality of gears can have a fourth gear ratio whereby a speed of the third shaft is greater than a speed of the second shaft.

A further embodiment of any of the foregoing transmissions, wherein each of the plurality of gears can be enmeshed with at least one other gear of the plurality of gears in the engaged and disengaged states of each clutch assembly.

A further embodiment of any of the foregoing transmissions, wherein the transmission can further include a bearing runner rotationally coupled to at least one of the first and second shafts.

A further embodiment of any of the foregoing transmissions, wherein the transmission can further include a bearing laterally restraining one or more of the gears relative to the first shaft or the second shaft.

A further embodiment of any of the foregoing transmissions, wherein the bearing can be joined to the bearing runner and one of the plurality of gears engageable by one of the clutch plates, wherein the bearing radially restrains the one gear relative to the one of the first and second shaft and permits rotation of the gear about the one shaft.

A further embodiment of any of the foregoing transmissions, wherein the clutch plates of each clutch assembly are interchangeable.

A further embodiment of any of the foregoing transmissions, wherein the bearing runners of each clutch assembly are interchangeable.

A further embodiment of any of the foregoing transmissions, wherein the bearings of each clutch assembly are interchangeable.

A further embodiment of any of the foregoing transmissions, wherein the plurality of gears can include a plurality of gear sets, each set of gears defining a gear ratio by which the first shaft drives the second shaft.

A further embodiment of any of the foregoing transmissions, wherein the gear ratios defined by the sets of the plurality of gears can be configured to drive the second shaft within an output speed range that is less than an input speed range of the first shaft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A clutch assembly for a transmission having a gear radially supported relative to a shaft, the clutch assembly comprising:
a clutch plate rotationally coupled to the shaft, wherein the clutch plate has an engaged state whereby a surface of the clutch plate abuts a surface of the gear to rotationally couple the gear to the shaft, and wherein the clutch plate has a disengaged state whereby the surface of the clutch plate is spaced from the surface of the gear to rotationally uncouple the gear and the shaft;
a locking member disposed within a recess of the gear; and
a biasing member abutting the locking member causing a portion of the locking member to protrude from the gear towards the clutch plate.

2. The clutch assembly of claim 1, and further comprising:
a bearing runner rotationally coupled to the shaft; and
a bearing joined to the bearing runner and the gear, wherein the bearing radially restrains the gear relative to the shaft and permits rotation of the gear about the shaft.

3. The clutch assembly of claim 1, and further comprising:
a thrust bearing joined to the clutch plate; and
an actuation arm supported by the thrust bearing relative to the shaft, wherein the thrust bearing permits relative rotation between the actuation arm and the clutch plate about the shaft.

4. The clutch assembly of claim 3, and further comprising:
an actuator; and
a linkage coupling a distal end of the actuation arm to the actuator, wherein a first position of the actuator places the clutch plate in the disengaged state, and wherein a second position of the actuator places the clutch plate in an engaged state.

5. The assembly of claim 1, wherein the clutch plate has a bore aligned with the locking member, and wherein the locking member engages the bore in the engaged state and thereby rotationally couples the gear and the clutch plate.

6. The assembly of claim 1, wherein the clutch surface and the gear surface have complementary conical shapes.

7. A transmission comprising:
a first shaft driven by an engine;
a second shaft;
a plurality of gears interconnecting the first shaft and the second shaft, wherein each gear of the plurality of gears is radially supported by one of the first and second shafts; and
a plurality of clutch assemblies, each clutch assembly comprising:
a clutch plate rotationally coupled to one of the first and second shafts, wherein the clutch plate has an engaged state whereby a surface of the clutch plate abuts a mating surface of one of the plurality of gears to rotationally couple the one of the plurality of gears to one of the first and second shafts and a disengaged state whereby the clutch surface is spaced from the mating surface to rotationally uncouple the one of the plurality of gears and the clutch plate;
a locking member disposed within a recess of the gear; and
a biasing member abutting the locking member causing a portion of the locking member to protrude from the gear towards the clutch plate, wherein the clutch plate has a bore aligned with the locking member, and wherein the locking member engages the bore in the engaged state and thereby rotationally couples the gear and the clutch plate.

8. The transmission of claim 7, wherein:
the plurality of clutches includes a first clutch assembly, a second clutch assembly, and a third clutch assembly;
the plurality of gears includes a first gear, a second gear, and a third gear;

the first clutch assembly has a first clutch plate configured to engage the first gear that is rotationally coupled to and concentric with the first shaft;

the second clutch assembly has a second clutch plate configured to engage the second gear that is rotationally coupled to and concentric with the second shaft; and the third clutch assembly has a third clutch plate configured to engage the third gear that is rotationally coupled to and concentric with the second shaft.

9. The transmission of claim 8, wherein the first clutch assembly has an engaged state that couples the first shaft to the second shaft via a first set of the plurality of gears having a speed-increasing gear ratio, and wherein the second clutch assembly and the third clutch assembly have engaged states that couple the first shaft to the second shaft via a second set of the plurality of gears and a third set of the plurality of gears, respectively, and wherein the second set of gears and the third set of gears have speed-reducing gear ratios.

10. The transmission of claim 9, wherein the first shaft has an operational range from a first rotational speed to a second rotational speed, and wherein the first, second, and third gear ratios are configured to maintain the second shaft between a third rotational speed and a fourth rotational speed, and wherein the difference between the first and second rotational speeds is greater than the difference between the third and fourth rotational speeds.

11. The transmission of claim 7, and further comprising:
a third shaft; and
a second plurality of gears interconnecting the second shaft to the third shaft.

12. The transmission of claim 11, wherein the second plurality of gears has a fourth gear ratio whereby a speed of the third shaft is greater than a speed of the second shaft.

13. The transmission of claim 7, wherein each gear of the plurality of gears is enmeshed with at least one of the other gears of the plurality of gears in the engaged and disengaged states of each clutch assembly.

14. The transmission of claim 7, wherein each clutch assembly further comprises:
a bearing runner rotationally coupled to one of the first and second shafts; and a bearing joined to the bearing runner and one of the plurality of gears engageable by one of the clutch plates, wherein the bearing radially restrains the gear relative to the shaft and permits rotation of the gear about the shaft.

15. The transmission of claim 14, wherein the bearing runners of each clutch assembly are interchangeable.

16. The transmission of claim 14, wherein the bearings of each clutch assembly are interchangeable.

17. The transmission of claim 7, wherein the plurality of gears include a plurality of gear sets, each gear set defining a gear ratio by which the first shaft drives the second shaft, and wherein the gear ratios are configured to drive the second shaft within an output speed range that is less than an input speed range of the first shaft.

18. The transmission of claim 7, wherein the clutch plates of each clutch assembly are interchangeable.

19. A transmission comprising:
a first shaft driven by an engine;
a second shaft;
a first set gears interconnecting the first shaft and the second shaft and including a first gear, wherein the first gear is rotationally coupled to and concentric with the first shaft, and wherein the first set of gears has a speed-increasing gear ratio;

a second set of gears interconnecting the first shaft and the second shaft and including a second gear, wherein the second gear is rotationally coupled to and concentric with the second shaft, and wherein the second set of gears has a speed-reducing gear ratio;

a third set of gears interconnecting the first shaft and the second shaft and including a third gear, wherein the third gear is rotationally coupled to and concentric with the second shaft, and wherein the third set of gears has a speed-reducing gear ratio, and wherein each gear of the first set of gears, the second set of gears, and the third set of gears is radially supported by one of the first and second shafts;

a first clutch assembly comprising:
a first clutch plate rotationally coupled to the first shaft, wherein the first clutch assembly has an engaged whereby a surface of the first clutch plate engages a mating surface of the first gear to rotationally couple the first shaft and the first gear, and wherein the first clutch assembly has a disengaged state whereby the surface of the first clutch plate is spaced from the mating surface of the first gear to rotationally uncouple the first gear and the first shaft;

a second clutch assembly comprising:
a second clutch plate rotationally coupled to the second shaft, wherein the second clutch assembly has an engaged whereby a surface of the second clutch plate engages a mating surface of the second gear to rotationally couple the second shaft and the second gear, and wherein the second clutch assembly has a disengaged state whereby the surface of the second clutch plate is spaced from the mating surface of the second gear to rotationally uncouple the second gear and the second shaft;

a third clutch assembly comprising:
a third clutch plate rotationally coupled to the second shaft, wherein the third clutch assembly has an engaged whereby a surface of the third clutch plate engages a mating surface of the third gear to rotationally couple the second shaft and the second gear, and wherein the third clutch assembly has a disengaged state whereby the surface of the third clutch plate is spaced from the mating surface of the third gear to rotationally uncouple the third gear and the second shaft;

wherein the first shaft has an operational range from a first rotational speed to a second rotational speed, and wherein the first, second, and third gear ratios are configured to maintain the second shaft between a third rotational speed and a fourth rotational speed, and wherein the difference between the first and second rotational speeds is greater than the difference between the third and fourth rotational speeds.

20. The transmission of claim 19, wherein the first clutch plate, the second clutch plate, and the third clutch plate are interchangeable.

* * * * *